Patented Nov. 28, 1950

2,531,715

UNITED STATES PATENT OFFICE 2,531,715

MANUFACTURE OF ANIMAL GLUE JELLIES

Thomas Aubrey White, Jackson Heights, N. Y., assignor to National Starch Products Inc., New York, N. Y., a corporation of Delaware No Drawing. Application April 28, 1948, Serial No. 23,860

4 Claims. (Cl. 106—126)

My invention relates to the manufacture of glue jellies and particularly to animal glue adhesive jellies.

It is well known that the presence of reducing sugars such as corn or invert sugars in animal glue adhesives results in what is herein referred to as a resinification reaction, indicated by a progressive increase in viscosity and a tough, rubbery texture, eventually reaching a point where the adhesive becomes unusable. This resinification reaction is greatly accelerated by heat.

Animal glue base adhesives are prepared in various forms, depending upon the ultimate industrial use. Thus, they may be made in the form of liquids or in the form of soft jellies or in the form of semi-rigid slabs. These last two named types of adhesives are melted down by heat, with or without the addition of water, in order to be applied to the objects to be adhered.

The above described resinification reaction tends to thicken and rubberize the glue composition during its manufacture; and this also may continue over a longer period of time in the finished glue product. This resinification reaction will result in a deterioration ranging from an undesirable thickening and rubberiness in the glues to their eventual actual insolubilization. Thus, when the glue has been made in the form of semi-rigid slabs, it is found that these slabs, after a certain period, can no longer be melted to revert to the fluid, usable form. In the case of soft jellies or liquid glues, the deterioration is chiefly noticed as a thickening and rubberiness. The application of heat to any of these glues accelerates the resinification reaction so that, in a relatively short time, they are converted into thick, rubbery, unusable masses.

Because of the above described resinification reaction, it has not heretofore been feasible to use reducing sugars as the plasticizing media in animal glue compositions, even though it would often be commercially advantageous to use reducing sugars, such as corn sugar, in place of cane sugar, for example, since corn sugar is frequently considerably less expensive than cane sugar.

The prime object of my present invention is to restrain the resinification of animal glues in the presence of reducing sugars, and thus to make possible the use of reducing sugars as the plasticizing media in animal glue compositions. This object is attained by adding to animal glue compositions a resinification inhibitor.

I have found that the addition of any chemical compound containing the ammonium radical restrains the animal glue-reducing sugar resinification reaction and thus acts as the resinification inhibitor. Regardless of the other radical or radicals in the particular ammonium compound chosen, it is the ammonium radical itself which functions as the resinification inhibitor. Thus, suitable resinification inhibitors would include ammonium sulphate, ammonium phosphate, ammonium acetate, ammonium chloride, ammonium nitrate, ammonium thiocyanate, and ammonium lactate, as well as the other known compounds containing the ammonium radical.

In the manufacture of animal glue compositions which are prepared and sold in the form of semi-rigid slabs, it is important for many commercial purposes that the resinification inhibitor shall not have a thinning or liquifying effect upon the animal glue composition. As described and claimed in my copending application Serial No. 653,122, filed March 8, 1946, now Patent No. 2,467,715, patented April 19, 1949, of which the present application is a continuation-in-part, for the manufacture of such semi-rigid slabs, an ammonium compound selected from the group consisting of ammonium phosphate, ammonium sulphate and ammonium acetate, is employed as the resinification inhibitor. With the use of such an ammonium compound, semi-rigid animal glue compositions of the type wherein thinning or liquifying of the animal glue is to be avoided are made.

Where, however, it is desired to manufacture an animal glue composition wherein a thinning or liquifying of the animal glue is wanted, other ammonium compounds should be selected. Thus, when making an animal glue composition to be sold in a liquid form, it is desirable that there be present a chemical which will cause the composition to maintain its liquid form even at normal room temperatures. Similarly, when the final product is to be a soft jelly, the presence of a thinning chemical tends to prevent its becoming a hard slab. Even when the final product is to be sold in the form of a semirigid slab, it is nevertheless sometimes desirable to have a thinning chemical present in an amount sufficient to soften the slab and to impart certain desirable working properties to the eventual melted glue product, without actually softening the slab to a point where it cannot be handled, wrapped and sold as a solid object.

The purpose of a thinning chemical in an animal glue composition is not only to soften or liquify the glue composition but also to cause the adhesive, when applied as a film to a surface, to retain its tackiness and adhesiveness for longer periods of time. This property of extended tackiness and adhesiveness is referred to in the art as slow-setting, and is an important characteristic for many industrial uses.

I have found that when manufacturing an animal glue composition containing a reducing sugar as a plasticizer, and where it is desired that the animal glue shall be thinned or liquified (as compared to its original consistency), then the resinification inhibitor should be chosen from those ammonium salts wherein the radical, other than the ammonium radical, is found to have a thinning or a liquifying effect upon the animal glue. Specifically, I prefer to use, as the resinification inhibitors, in the manufacture of thinned or softened animal glue compositions, salts selected from the group ammonium chloride, ammonium nitrate, ammonium thiocyanate or ammonium lactate. The claims of the present application are directed to the making of animal glue compositions of this nature.

The amount of ammonium compound to be added depends upon other variables, such as the particular type of ammonium chemical used, the amount of reducing sugar present, the initial strength of the animal glue base and the type of glue product being manufactured. Thus, if the final product is to be in the form of a soft slab, the amount of thinner-resinification inhibitor employed must not be so great as to actually liquify rather than soften the final product. On the other hand, when the glue product being manufactured is to be in the form of a liquid or a soft jelly, it is obviously possible to use larger quantities of the thinner-resinification inhibitor. The resinification restraining effect is noticeable even with the use of only a fraction of 1% of ammonium compound. However, I prefer to use from 5% to 15% and, in no case, more than 20%. Percentages are by weight and are based upon the dry weight of the animal glue in the composition.

It is often found advantageous to use mixtures of different ammonium salts, such, for example, as mixtures of ammonium chloride and ammonium sulphate. It is thus possible to limit the thinning effect by using only a limited amount of the thinning-type ammonium salt together with one of the non-thinning ammonium salts, such as ammonium sulphate, amonium phosphate and ammonium acetate.

Animal glue compositions containing reducing sugars, with the addition of an ammonium compound, show no perceptible signs of resinification and remain in excellent condition for long periods, as will be seen from the examples.

I have further found that the resinification inhibiting effect of ammonium compounds is most pronounced within the pH range 4.0 to 6.0, although the effect is also present at other pH values. The tendency toward resinification is increased with higher pH values as well as at increased temperatures.

The animal glue compositions herein referred to need not be plasticized exclusively by reducing sugars but may contain mixtures of reducing sugars with other plasticizers such as cane sugar, glycerine and diethylene glycol.

When compositions containing reducing sugars are heated there is sometimes a certain amount of caramelization with resulting darkening. It is, therefore, sometimes desirable to include in such compositions a small amount of a reducing chemical, such as an alkali metal bisulfite or hydrosulfite which, by its bleaching action, counteracts any darkening caused by caramelization.

The following examples are given to illustrate the practice of my invention:

*Example I*

This example illustrates the manufacture of a slow-setting, soft, slab type flexible glue, using corn syrup (known in the trade as glucose) as the plasticizer and ammonium chloride as the softener-resinification inhibitor.

The following ingredients are added in the order given, maintaining the temperature of the mass at 140° F.–160° F.:

50 pounds water
1.5 pounds phenol
90 pounds animal glue (347 gram test hide glue)
90 pounds glucose
14 pounds ammonium chloride
½ pound sodium hydrosulfite The above mixture is adjusted to pH 5.0 by the addition of hydrochloric acid. The mass is then poured into molds and allowed to cool, forming flexible, semi-rigid slabs.

If, in another variation of the above example, a batch be prepared using the same ingredients and relative proportions as shown above, with the exception that the ammonium chloride be omitted, and the mass is heated at 190° F., within two to four hours the mass becomes so rubbery, tough and unworkable that it can no longer be used as an adhesive.

In still another variation of the above example, the ingredients and procedure are as given except that in place of 14 pounds of ammonium chloride there is employed a mixture of 7 pounds ammonium chloride and 7 pounds ammonium sulphate. The resultant slabs are not quite as soft as those wherein the straight ammonium chloride is used, nor are the applied adhesive films as slow-setting, but both types of glue composition show excellent resistance to resinification.

*Example II*

This example illustrates the manufacture of an animal glue jelly composition containing glucose and ammonium chloride.

The following ingredients are added in the order given, maintaining the temperature of the mass at 140° F. to 160° F.:

400 pounds water
5 pounds phenol
200 pounds animal glue (235 gram test hide glue)
200 pounds glucose syrup
10 pounds ammonium chloride A plasticized animal glue jelly composition results, which shows no perceptible resinification even after prolonged periods.

*Example III*

This example illustrates the manufacture of a liquid animal glue composition using glucose as the plasticizer and ammonium thiocyanate as the thinner-resinification inhibitor.

The following ingredients are added in the order given, maintaining the temperature of the mass at 140° F.–160° F.:

100 pounds water
2 pounds phenol
75 pounds animal glue (110 gram test bone glue)
75 pounds glucose
15 pounds ammonium thiocyanate The above mixture is adjusted to a pH 5.0 by the addition of hydrochloric acid.

This liquid glue composition is highly resistant to thickening and deterioration of texture due to resinification of the animal glue.

Example IV

This example illustrates the manufacture of a soft slow-setting slab type flexible glue using a mixture of glycerine and a corn sugar of high reducing sugar content as the plasticizer, together with an amount of ammonium nitrate sufficient to reduce the resinification tendency but not sufficient to liquefy or unduly soften the resultant slab.

The following ingredients are added in the order given, maintaining the temperature of the mass at 140° F.–160° F.:

50 pounds water
2 pounds phenol
90 pounds animal glue (347 gram test hide glue)
60 pounds corn sugar (of the type known in the trade as Nabob)
30 pounds glycerine
2 pounds ammonium nitrate The above mixture is adjusted to pH 5.0 by the addition of hydrochloric acid. The mass is then poured into molds and allowed to cool, forming flexible, soft slabs. The glue can be re-melted easily, even after long periods, without indication of substantial resinification.

If the above example is repeated with the exception that the ammonium nitrate is increased to 18 pounds, the resultant product can no longer be formed into solid slabs, but rather results in a soft, very slow-setting, jelly-type of adhesive.

Example V

This example illustrates the manufacture of a jelly-type animal glue composition which might be considered intermediate between the liquid and the slab types. It also illustrates the use of glucose as the plasticizer, with ammonium lactate as the softener-resinification inhibitor.

The following ingredients are added in the order given, maintaining the temperature of the mass at 140° F.–160° F.:

80 pounds water
2 pounds phenol
90 pounds animal glue (235 gram test bone glue)
60 pounds glucose
9 pounds ammonium lactate The above mixture is adjusted to a pH 5.0 by the addition of hydrochloric acid.

Upon cooling, this composition forms a soft jelly which can be re-melted even after long periods of time, without any appreciable deterioration of quality due to resinification.

The phenol in all the above examples functions as a preservative.

The relative strength of various animal glues is ordinarily described in terms of the gram-jelly strength scale adopted by the National Association of Glue Manufacturers, based upon measurements on the Bloom Gelometer, and it is this scale which I use in the examples, when referring to the gram strength of glues.

The specific compositions shown in the examples are merely by way of illustration of the use of resinification inhibitors in animal glue compositions. Animal glue compositions are used in countless variations for adhesive and other purposes. My invention covers the use of resinification inhibitors in animal glue compositions generally and is not limited to the specific embodiment shown in these examples. Since every manner of animal glue formulation is covered by the scope of this invention, it is obvious that specific proportions of such components as animal glues, sugar, water, and the like, need not be given here. Similarly, the specific resinification inhibitor chosen, or the proportion thereof, can vary with different glue formulations. It is sometimes advisable to use a mixture of ammonium compounds.

The product of my invention may be sold in the form indicated by the above examples, or the dry ingredients may be blended and sold as such, the consumer adding the water and any other liquid components.

I claim:

1. An animal glue composition comprising animal glue, a reducing sugar acting as a plasticizing medium and a selected ammonium compound the ammonium radical of which acts to reduce or inhibit the resinification of the glue composition, the ammonium compound being selected from the group consisting of ammonium chloride, ammonium nitrate, ammonium thiocyanate and ammonium lactate, the said ammonium compound being in the proportion of from a fraction of 1% to 20% by weight of the dry animal glue in the composition.

2. The animal glue composition of claim 1 in which the plasticizing medium consists of a reducing sugar combined with other plasticizers.

3. An animal glue composition comprising animal glue, a reducing sugar acting as a plasticizing medium and a selected ammonium compound the ammonium radical of which acts to reduce or inhibit the resinification of the glue composition, the ammonium compound being selected from the group consisting of ammonium chloride, ammonium nitrate, ammonium thiocyanate and ammonium lactate, admixed with an ammonium compound selected from the group consisting of ammonium sulphate, ammonium phosphate and ammonium acetate, the proportion of ammonium compound of the second-mentioned group being in a proportion sufficient to limit the thinning effect of the ammonium compound of the first-mentioned group.

4. The ammonium compound of claim 3 in which the proportion of the total ammonium compound is from a fraction of 1% to 20% by weight of the dry animal glue in the composition.

THOMAS AUBREY WHITE.

REFERENCES CITED

The following references are of record in the file of this patent:

UNITED STATES PATENTS

| Number | Name | Date |
|---|---|---|
| 565,361 | Link | Aug. 4, 1936 |
| 2,467,715 | White | Apr. 19, 1949 |